United States Patent
Biallas

(10) Patent No.: US 8,556,772 B2
(45) Date of Patent: Oct. 15, 2013

(54) MANUAL TRANSMISSION CLUTCH PROTECTION APPARATUS

(75) Inventor: Jeffrey J. Biallas, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 237 days.

(21) Appl. No.: 13/117,220

(22) Filed: May 27, 2011

(65) Prior Publication Data

US 2012/0297913 A1    Nov. 29, 2012

(51) Int. Cl.
*B60W 10/04* (2006.01)
*B60W 10/10* (2012.01)
*B60K 20/00* (2006.01)

(52) U.S. Cl.
USPC ........................................ 477/115; 74/473.21

(58) Field of Classification Search
USPC ....................................... 477/115; 74/473.21
See application file for complete search history.

(56) References Cited

U.S. PATENT DOCUMENTS

| | | | |
|---|---|---|---|
| 2006/0052217 A1* | 3/2006 | Maxon | 477/115 |
| 2007/0135261 A1* | 6/2007 | Berger et al. | 477/96 |
| 2008/0305928 A1* | 12/2008 | Shintani et al. | 477/115 |

* cited by examiner

*Primary Examiner* — Edwin A Young

(57) ABSTRACT

A manual transmission clutch protection apparatus includes a shift gate cylinder acted upon by the operator controlled shift lever having a first shift pattern that represents all possible shift positions and two or more additional but limited shift patterns corresponding to certain gears which limit the gears selectable and enageageable by the vehicle operator. Two or more actuators which may be solenoids or other electric, hydraulic or pneumatic actuators translate blocking pins or plungers into the additional or limited shift patterns to lockout or block motion of the shift lever and shift gate cylinder into certain gears. Engine speed and temperature sensors, a vehicle speed sensor and a current gear sensor provide data which is utilized to compute which gears, under current sensed operating conditions, should be locked out, that is, unavailable for selection by the vehicle operator.

19 Claims, 2 Drawing Sheets

MANUAL TRANSMISSION CLUTCH PROTECTION APPARATUS

FIELD

The present disclosure relates to clutches for manual transmissions for motor vehicles and more particularly to a speed limiting device for manual transmission clutches for motor vehicles.

BACKGROUND

The statements in this section merely provide background information related to the present disclosure and may or may not constitute prior art.

Although no longer the most popular choice in consumer motor vehicles (passenger cars, sport utility vehicles and light trucks), the manual transmission and clutch were originally and for many years the sole powertrain speed and torque matching components available. Nonetheless, for certain uses and for certain consumers, the manual transmission and manual clutch remain the speed and torque matching components of choice. The absolute and positive control of the vehicle powertrain, generally better fuel economy and freedom of operation offered by such components to the driver has not been duplicated in even the most sophisticated automatic transmissions.

The freedom of operation is not without drawbacks, however. For example, selection and operation in a gear ratio, i.e., fourth or fifth, which is too high for the current vehicle speed results in lugging by the engine and sluggish vehicle acceleration. Engagement and disengagement of the clutch by the vehicle operator which is excessively slow or preventing full engagement of the clutch by resting a foot on the clutch pedal causes excessive wear of the clutch surface and can significantly shorten clutch life. A downshift which skips a gear, i.e., a fourth to second gear downshift or a fourth to first gear downshift, can cause dramatic increases in clutch disk speed which can damage the clutch disk and, again, shorten its life. Newer manual transmissions with multiple cone synchronizers can achieve synchronization with much larger speed differentials than single cone synchronizers, thus generating even higher, vehicle driven clutch disk speeds during skipped gear downshifts. Clutch failures which are the result of such overspeed constitute approximately 20 percent of the total of clutch failures. While such drawbacks are generally associated with drivers who are either unskilled or unfamiliar with the vehicle, it is apparent that intervention by vehicle systems could reduce or eliminate some or all of these problems. The present invention is so directed.

SUMMARY

The present invention provides a manual transmission clutch protection apparatus. The apparatus includes a shift gate cylinder or similar member acted upon by the operator controlled shift lever having a first shift pattern engaged by a stationary register pin that represents and allows all possible shift positions and two or more additional but limited shift patterns corresponding to certain gears which limit the gears selectable and enagageable by the vehicle operator. Two or more actuators which may be solenoids or other electric, hydraulic or pneumatic actuators translate blocking pins or plungers into the additional or limited shift patterns to block motion of the shift lever and shift gate cylinder into certain gears. An engine speed sensor and a vehicle speed sensor as well as an optional temperature sensor and an optional current gear sensor provide data which is utilized to compute which gears, under current sensed operating conditions, should be locked out, that is, unavailable for selection by the vehicle operator, in order to prevent damage to the clutch.

Thus it is an aspect of the present invention to provide a clutch protection apparatus for a manual transmission.

It is a further aspect of the present invention to provide a clutch protection apparatus having a shift gate cylinder including a shift pattern that represents all possible shift positions.

It is a still further aspect of the present invention to provide a clutch protection apparatus having a shift gate cylinder including multiple shift patterns that prevent certain shifts.

It is a still further aspect of the present invention to provide a clutch protection apparatus having multiple actuators having pins or plungers that selectively engage multiple shift patterns that prevent certain shifts.

It is a still further aspect of the present invention to provide a clutch protection apparatus having an engine speed sensor, a vehicle speed sensor, an optional temperature sensor and an optional current gear sensor.

It is a still further aspect of the present invention to provide a clutch protection apparatus having components which receive data from sensors and compute which gears, under current sensed operating conditions, should be locked out, that is, unavailable for selection by the vehicle operator.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
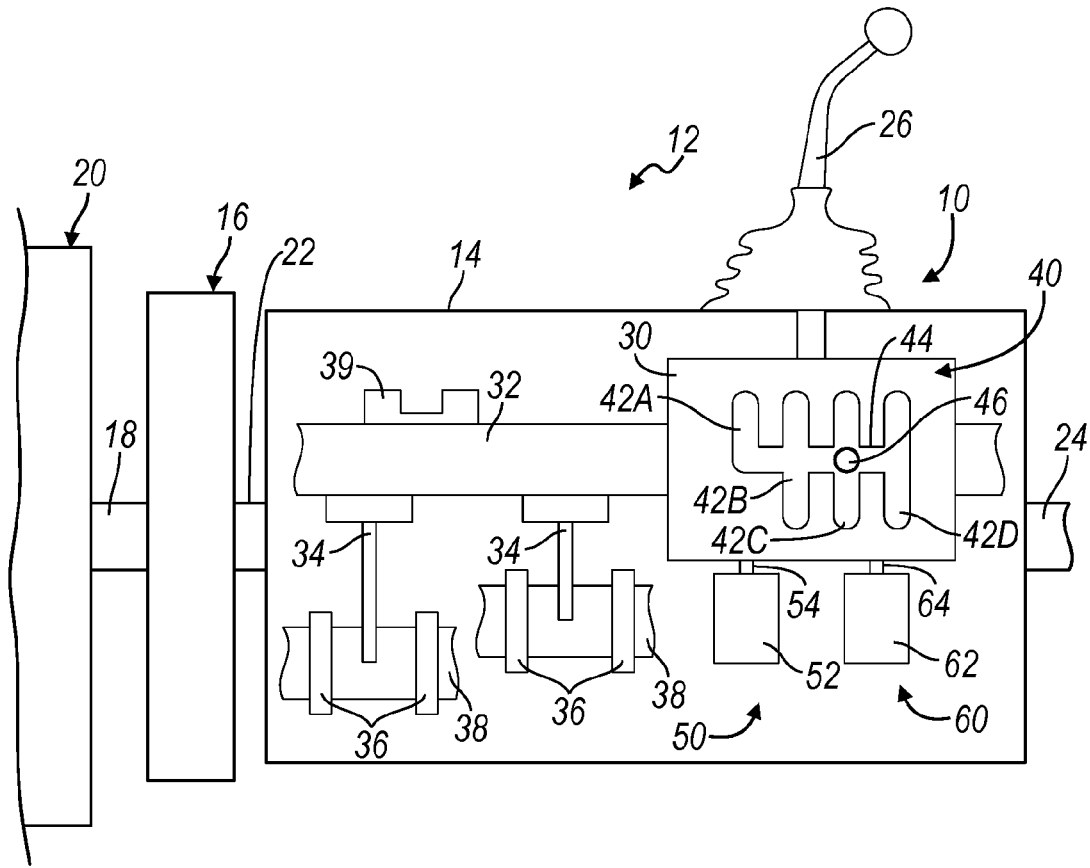
FIG. 1 is a side elevational view of a manual transmission shift assembly incorporating the present invention.
Figure 2:
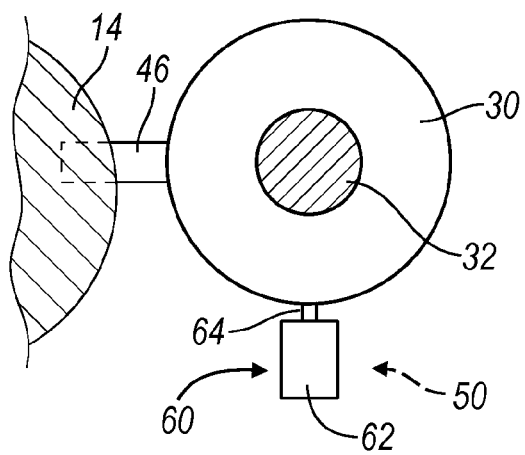
FIG. 2 is an enlarged, end elevational view of a portion of a manual transmission shift assembly incorporating the present invention.

With reference to FIGS. 1 and 2, a clutch protection apparatus for a manual transmission is illustrated and generally designated by the reference number 10. The clutch protection apparatus 10 is associated with a manual transmission 12 having a housing 14 which supports, positions and protects various components of the transmission 12 including the clutch protection apparatus 10. The transmission 12 includes a main, friction plate clutch 16 which is operably disposed between an output shaft 18 of a prime mover 20 such as a gasoline, flex-fuel or Diesel engine or hybrid or electric power plant, a transmission input shaft 22 and a transmission output shaft 24.

The transmission 12 also includes a shift lever 26 which extends into the vehicle passenger compartment (not illustrated) and is engageable and moveable by the vehicle operator (also not illustrated). Alternatively, the transmission 12 may be coupled to the shift lever 26 by levers and cables (also not illustrated). The shift lever 26 is operably coupled to a shift gate or location cylinder 30 or similar member. The shift gate or location cylinder 30 is secured to or formed integrally with a shift actuation shaft 32 that is co-axial with the shift gate cylinder 30. The shift gate cylinder 30 and the shift actuation shaft 32 are supported in suitable apertures, slots or blind openings (not illustrated) in the housing 14 so that they may freely translate and rotate about the axis defined thereby in accordance with forces applied thereto by the shift lever 26.

Secured to the shift actuation shaft 32 at multiple locations are two or more shift forks 34 that engage and translate synchronizer clutches 36. Each of the synchronizer clutches 36 is associated with one or two gears (not illustrated) that are disposed upon countershafts or layshafts 38 and which are first synchronized with such countershafts or layshafts 38 and then directly and positively connected to the countershafts or layshafts 38 by the synchronizer clutches 36 in accordance with conventional manual transmission operation. The shift actuation shaft 32 also includes one or more lockout mechanisms 39 that ensure that more than one gear cannot be engaged at any one time.

Returning to the shift gate cylinder 30, it includes a rotation and translation limiting gate assembly 40. The gate assembly 40 defines a plurality of spaced apart channels or slots 42A, 42B, 42C and 42D that are arranged circumferentially on the outside surface of the shift gate cylinder 30 and are connected by a continuous axial channel or slot 44 (or plurality of short channels or slots) disposed at the circumferential mid-point of the channels or slots 42B, 42C and 42D. A single register or locator pin 46 is mounted to and secured within the housing 14 or to any suitable component thereof and extends radially into the channels or slots 42A, 42B, 42C, 42D and 44. The register or locator pin 46 and the rotation and translation limiting gate assembly 40 thus cooperate to control and define the allowed or available motion of the shift gate cylinder 30 and the shift actuation shaft 32. This motion corresponds to the motion of the shift lever 26 necessary to select and engage the various forward and reverse gears of the manual transmission 12.

Typically, though not necessarily, the half slot 42A will be assigned to and actuate reverse, the upper half of the full left slot 42B will be assigned to and actuate first gear and the lower half of the full left slot 42B will be assigned to and actuate second gear. The upper half of the full middle slot 42C will be assigned to and actuate third gear and the lower half of the full middle slot 42C will be assigned to and actuate fourth gear. The upper half of the full right slot 42D will be assigned to and actuate fifth gear and the lower half of the full right slot 42D will be assigned to and actuate sixth gear. It should be appreciated that the foregoing described shift pattern is exemplary and illustrative only and that other shift patterns and shift patterns having more or fewer slots and gears are well within the scope of this invention.

Figure 3:
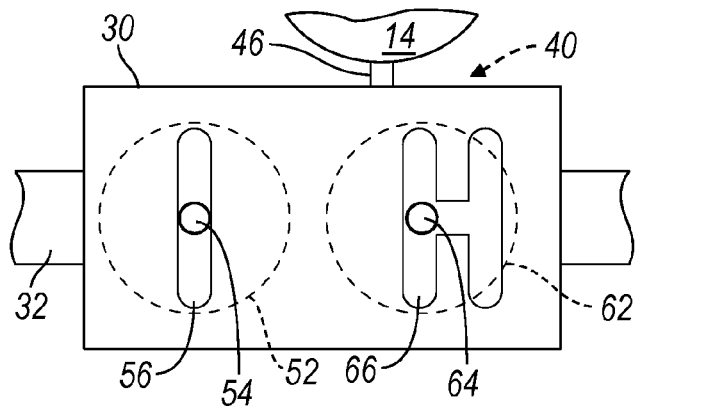
FIG. 3 is an enlarged, bottom view of a portion of a manual transmission shift assembly incorporating the present invention.

Referring now to FIGS. 1, 2 and 3, preferably disposed at any convenient circumferential remove, e.g., 90° or 180°, from the location of the register or locator pin 46 are a pair of gate blocking actuator assemblies 50 and 60. A first gate blocking actuator 52 includes a pin, plunger or stub shaft 54 that is selectively received within a first circumferential slot 56 having a circumferential length at least as long as the right slot 42D. The first gate blocking actuator 52 may be a solenoid or an electric linear, hydraulic or pneumatic actuator. When the pin, plunger or shaft 54 of the first gate blocking actuator 52 is extended into the first circumferential slot 56, motion of the shift gate cylinder 30 is restricted to rotation in the right slot 42D and selection of either (only) fifth or sixth gears. As will be explained more fully below, this prevents a downshift into a lower gear that, given current operating conditions, might overspeed the clutch 16 and cause damage thereto.

A second gate blocking actuator 62 includes a pin, plunger or stub shaft 64 that is selectively received within a second circumferential "H" pattern slot 66 having circumferential lengths at least as long as the slots 42C and 42D and identical axial spacing. The gate blocking actuator 62 may also be a solenoid or an electric linear, hydraulic or pneumatic actuator. When the pin, plunger or shaft 64 of the second gate blocking actuator 62 is extended into the second circumferential "H" slot 66, motion of the shift gate cylinder 30 is restricted to rotation in the full middle slot 42C and the full right slot 42D and selection of either third, fourth, fifth or sixth gears. Note that, as clearly shown in FIG. 3, the pin or plunger 64 is similarly located in the slot 66 relative to the register pin 46 and the slots 42C and 42D, that is, assuming the "H" slot 66 corresponds to the slots 42C and 42D and relates to third, fourth, fifth and sixth gears, the pin or plunger 64 is disposed to the left in FIG. 3, in the slot corresponding to third and fourth gears. As will be explained more fully below, this arrangement also prevents a downshift into a lower gear that, given current operating conditions, might overspeed and damage the clutch 16.

Figure 4:
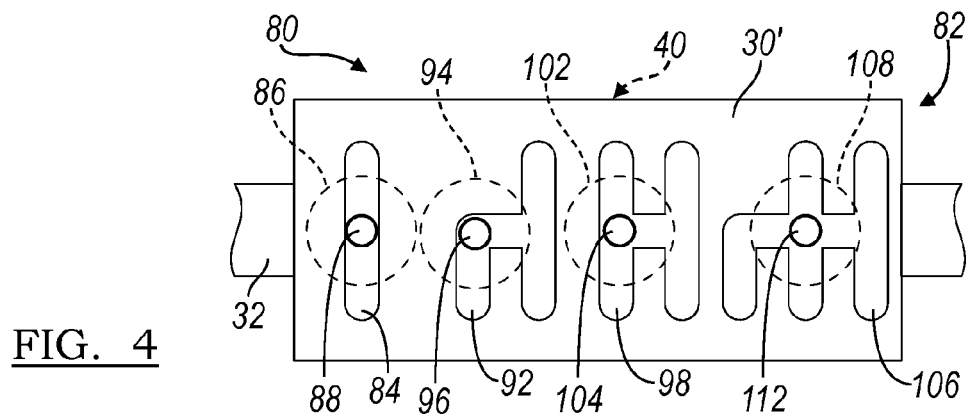
FIG. 4 is an enlarged, bottom view of a portion of an alternate embodiment of a manual transmission shift assembly incorporating the present invention.

In FIG. 4, an alternate embodiment of a portion of a manual transmission shift assembly according to the present invention is illustrated and designated by the reference number 80. The alternate embodiment shift assembly 80 includes a shift gate cylinder 30' which is disposed on and secured to the shift actuation shaft 32 or may be formed integrally therewith. Not shown in FIG. 4 but included in the shift gate cylinder 30' is the rotation and translation limiting gate assembly 40 of FIG. 1 defining the plurality of spaced apart, interconnected channels or slots 42A, 42B, 42C and 42D. The shift gate cylinder 30' also includes a second, selectively engageable rotation and translation limiting gate assembly 82. The gate assembly 82 defines four spaced apart shift or gate patterns 84, 92, 98 and 106 that are preferably arranged along a longitudinal axis on the outside surface of the shift gate cylinder 30'. Each of the shift or gate patterns 84, 92, 98 and 106 locks out or prohibits operator selection of certain gears much as described above except that the four shift or gate patterns 84, 92, 98 and 106 provide improved and more targeted lockout control and operation.

The first shift or gate pattern 84 is associated with a first actuator 86 which may be electric, hydraulic or pneumatic and which includes a pin, plunger or shaft 88 which may be activated or energized to extend into the shift or gate pattern 84 and lockout or inhibit selection of all gears except fifth and sixth. The second shift or gate pattern 92 is associated with a second actuator 94 which may be electric, hydraulic or pneumatic and which includes a pin, plunger or shaft 96 which may be activated or energized to extend into the shift or gate pattern 92 and lockout or inhibit selection of first, second and third gears.

The third shift or gate pattern 98 is associated with a third actuator 102 which may be electric, hydraulic or pneumatic and which includes a pin, plunger or shaft 104 which may be activated or energized to extend into the shift or gate pattern 98 and lockout or inhibit selection of first and second gears. The fourth shift or gate pattern 106 is associated with a fourth actuator 108 which may be electric, hydraulic or pneumatic and which includes a pin, plunger or shaft 112 which may be activated or energized to extend into the shift or gate pattern 106 and lockout or inhibit selection of first gear. Once again, it should be noted that except for the pin or plunger 88, the pins or plungers 96, 104 and 112 are arranged similarly such that they all reside in the same region of the shift or gate pattern corresponding to, in this example, third and fourth gears when the single register or locator pin 46 (shown in FIG. 1) is similarly disposed.

Figure 5:
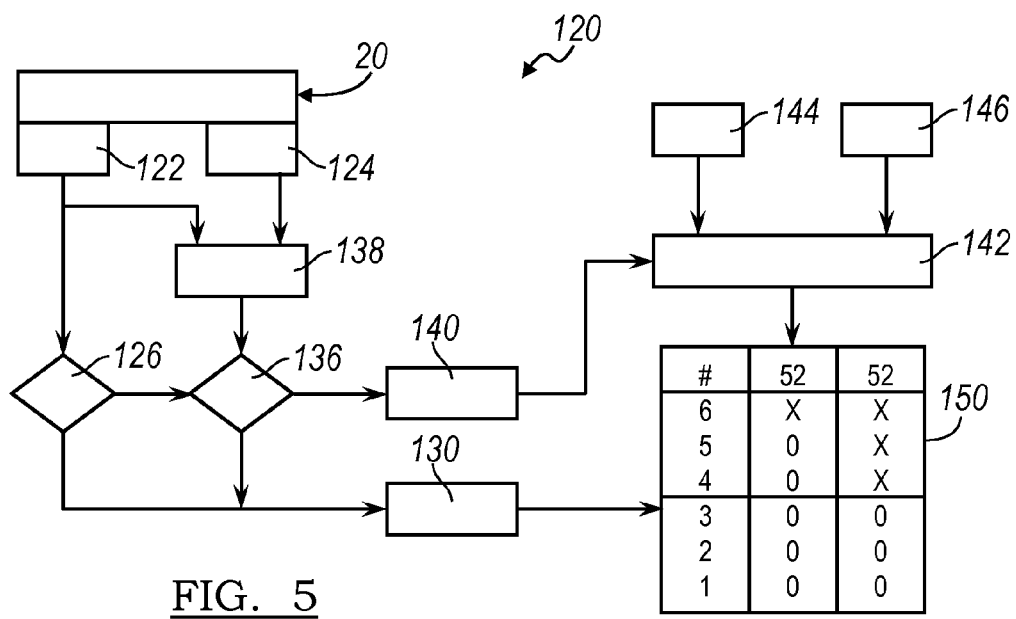
FIG. 5 is a diagram of the components and operational scheme of a clutch protection apparatus according to the present invention for a manual transmission.

Referring now to FIG. 5 and the other drawing Figures, components relating to operation of the manual transmission clutch protection apparatus 10 and 80 according to the present invention are generally designated by the reference number 120 and will now be described. The components 120 relating to operation include an engine speed sensor 122 and an optional engine temperature sensor 124. Data from the engine speed sensor 122 is provided to a first comparator 126 which determines if the speed of the engine 20 is above or below 1800 r.p.m. or other minimum threshold speed. If it is below 1800 r.p.m., the first comparator 126 provides a signal to a control module 130 which disables the clutch protection apparatus 10 and 80. If the speed of the engine 20 is above 1800 r.p.m., the first comparator 126 provides a signal to a second comparator 136.

The second comparator 136 receives data from a first computational module 138 which receives data regarding both the speed of the engine 20 from the engine speed sensor 122 and the temperature of the engine 20 from the optional engine temperature sensor 124. The first computational module 138 determines a combined engine speed/temperature value which is provided to the second comparator 136. If the second comparator 136 determines that the current combined engine speed/temperature value is below a predetermined (threshold) value, it provides a signal to the control module 130 which again disables the clutch protection apparatus 10 and 80. If the second comparator 136 determines that the current combined engine speed/temperature value is above a predetermined (threshold) value, it provides a signal to a second control module 140 which enables the clutch protection apparatus 10 and 80 by providing a signal to a second computational module 142. The second computational module 142 receives data from a vehicle speed sensor 144 and an optional current gear sensor 146 which is typically associated with the shift gate cylinder 30 or 30'. Based upon this data, the second computational module 142 issues commands to the actuators 52 and 62 in accordance with the lookup table 150 to lockout or block the selection of certain gears by the vehicle operator. In the lookup table, an "X" in a column means an actuator is activated and an "O" in a column means it is de-activated. For example, if the manual transmission 12 is in fourth gear and the second control module 140 has enabled the apparatus 10 and 80, the actuator 62 will be activated to prevent or block a shift into first or second gear, that is, into the full left slot 42B of the rotation and translation limiting gate assembly 40.

It should be appreciated that the determination of the particular gears that are blocked or locked out by the activation of the actuators 52, 62, 86, 94, 102 and 108 and the conditions under which they are blocked or locked out, will be based upon many factors including engine speed, engine temperature, vehicle speed, the gear ratios of the transmission, the number of gears, the clutch size and clutch safety factor, to name the more significant factors.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch protection apparatus for a manual transmission comprising, in combination,
   a shift lever,
   a shift gate member disposed on a shift actuation shaft and operably coupled to said shift lever, said shift gate member having a first shift pattern slot on an outside surface and said shift actuation shaft having at least one shift fork secured thereto,
   said first shift pattern slot corresponding to axial and rotational positions of said shift actuation shaft in which forward and reverse gears are engaged,
   a stationary register pin disposed in said first shift pattern slot,
   at least one additional shift pattern slot on said shift gate member corresponding to a limited gear selection,
   an actuator having a pin for selective disposition in said additional shift pattern slot, and
   means for activating said actuator when selection of certain gears would result in an overspeed condition of a transmission clutch.

2. The clutch protection apparatus of claim 1 wherein said additional shift pattern slot is a circumferential slot.

3. The clutch protection apparatus of claim 1 wherein said actuator is a solenoid.

4. The clutch protection apparatus of claim 1 wherein said means for activating includes an engine speed sensor and a vehicle speed sensor.

5. The clutch protection apparatus of claim 1 further including a second additional shift pattern slot on said shift gate member corresponding to a different limited gear selection.

6. The clutch protection apparatus of claim 5 further including a second actuator having a second pin for selective disposition in said second additional shift pattern slot.

7. The clutch protection apparatus of claim 5 wherein said second additional shift pattern slot defines an "H".

8. A clutch protection apparatus for a transmission comprising, in combination,
   a manual transmission having an input shaft, an input clutch, a shift lever and an output shaft, a shift gate cylinder acted upon by said shift lever and operably coupled to said shift lever, said shift gate cylinder defining a first shift pattern slot corresponding to axial and rotational positions of said shift actuation shaft in which forward and reverse gears are engaged,
   a stationary register pin disposed in said first shift pattern slot,
   a shift actuation shaft extending from said shift gate cylinder, at least one shift fork attached to said shift actuation shaft,
   at least one additional shift pattern slot on said shift gate cylinder corresponding to a limited gear selection,
   an actuator having a pin for selective disposition in said additional shift pattern slot, and
   control means for activating said actuator when selection of certain gears would result in an overspeed condition of said input clutch.

9. The clutch protection apparatus for a transmission of claim 8 wherein said additional shift pattern slot is a circumferential slot.

10. The clutch protection apparatus of claim 8 wherein said actuator is a solenoid.

11. The clutch protection apparatus of claim 8 wherein said means for activating includes an engine speed sensor and a vehicle speed sensor.

12. The clutch protection apparatus of claim 8 further including a second additional shift pattern slot on said shift gate cylinder corresponding to a different limited gear selection.

13. The clutch protection apparatus of claim 12 further including a second actuator having a second pin for selective disposition in said second additional shift pattern slot.

14. The clutch protection apparatus of claim 12 wherein said second additional shift pattern slot defines an "H".

15. A clutch protection apparatus for a manual transmission comprising, in combination,
   an input clutch,
   a shift lever,
   a shift gate member disposed on a shift actuation shaft and operably coupled to said shift lever, said shift gate member having a shift pattern slot on an outside surface and said shift actuation shaft having at least one shift fork secured thereto,
   said shift pattern slot corresponding to axial and rotational positions of said shift actuation shaft in which forward and reverse gears are engaged,
   a stationary register pin disposed in said shift pattern slot,
   a first additional shift pattern slot on said shift gate member corresponding to a first limited gear selection,
   a first actuator having a pin for selective disposition in said first additional shift pattern slot,
   a second additional shift pattern slot on said shift gate member corresponding to a second limited gear selection,
   a second actuator having a pin for selective disposition in said second additional shift pattern slot, and
   means for activating said actuators when selection of certain gears would result in an overspeed condition of said input clutch.

16. The clutch protection apparatus of claim 15 wherein said first additional shift pattern slot is a straight slot and said second additional shift pattern slot is an "H" pattern slot.

17. The clutch protection apparatus of claim 15 wherein said first and second actuators are solenoids.

18. The clutch protection apparatus of claim 15 wherein said means for activating includes an engine speed sensor and a vehicle speed sensor.

19. The clutch protection apparatus of claim 15 further including a third additional shift pattern slot and a fourth additional shift pattern slot on said shift gate member and a third actuator having a pin for disposition in said third additional shift pattern slot and a fourth actuator having a pin for disposition in said fourth additional shift pattern slot.

* * * * *